(12) United States Patent
Vue

(10) Patent No.: US 11,118,808 B2
(45) Date of Patent: Sep. 14, 2021

(54) METHOD, SYSTEM, AND DEVICE FOR LIQUID DRAINAGE

(71) Applicant: THE BOEING COMPANY, Seal Beach, CA (US)

(72) Inventor: Fue Chue Vue, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 1131 days.

(21) Appl. No.: 14/098,970

(22) Filed: Dec. 6, 2013

(65) Prior Publication Data

US 2015/0159909 A1 Jun. 11, 2015

(51) Int. Cl.
*F24F 13/22* (2006.01)
*B64D 13/06* (2006.01)

(52) U.S. Cl.
CPC ............ *F24F 13/222* (2013.01); *B64D 13/06* (2013.01); *B64D 2013/0662* (2013.01); *F24F 2013/227* (2013.01)

(58) Field of Classification Search
CPC . B23P 19/04; B64D 13/06; B64D 2013/0603; B64D 2013/0662; F24F 13/222; F24F 2013/227; Y10T 29/49622; Y10T 29/49826
USPC ............................ 29/428, 897.2; 62/288, 291
See application file for complete search history.

(56) References Cited

U.S. PATENT DOCUMENTS

| | | | |
|---|---|---|---|
| 2,447,486 A | 8/1948 | Burke, Jr. | |
| 2,585,570 A | 2/1952 | Messinger et al. | |
| 3,623,332 A * | 11/1971 | Fernandes | B64D 13/06 62/172 |
| 3,861,142 A * | 1/1975 | Bose | F01N 1/18 261/124 |
| 3,991,589 A * | 11/1976 | Rath | B63J 2/08 62/62 |
| 4,028,008 A * | 6/1977 | Shelton | F03G 6/00 417/52 |
| 4,187,090 A | 2/1980 | Bizzarro et al. | |
| 4,326,383 A | 4/1982 | Reed | |
| 4,430,867 A * | 2/1984 | Warner | B60H 1/32 62/172 |

(Continued)

FOREIGN PATENT DOCUMENTS

| | | |
|---|---|---|
| CA | 2552157 A1 | 7/2005 |
| CN | 101014806 A | 8/2007 |

(Continued)

OTHER PUBLICATIONS

Canada Office Action for related application 2,870,240 dated Nov. 27, 2015; 3 pp.

(Continued)

*Primary Examiner* — Avinash A Savani
*Assistant Examiner* — Frances F. Hamilton
(74) *Attorney, Agent, or Firm* — Armstrong Teasdale LLP

(57) ABSTRACT

A method, system, and device for liquid drainage are provided. The system includes a drain tube coupled to the air distribution system, a sump coupled to the drain tube and configured to receive liquid from the drain tube, and a suction system in flow communication with the sump. The suction system is configured to create a pressure in the sump that is lower than a pressure in the air distribution system.

15 Claims, 3 Drawing Sheets

(56) References Cited

U.S. PATENT DOCUMENTS

| | | | | |
|---|---|---|---|---|
| 4,517,813 | A | * | 5/1985 | Eggebrecht ............ B64D 13/00 55/448 |
| 4,681,610 | A | | 7/1987 | Warner |
| 4,819,720 | A | | 4/1989 | Howard |
| 4,949,626 | A | * | 8/1990 | Townsend ............ E02D 31/008 454/341 |
| 5,218,838 | A | * | 6/1993 | Kitamoto ................ F24F 13/22 137/240 |
| 5,241,828 | A | | 9/1993 | Kapitulnik |
| 5,326,474 | A | * | 7/1994 | Adams ............... B01D 17/0208 210/519 |
| 5,380,229 | A | * | 1/1995 | Korsgaard ............ B63B 22/023 441/3 |
| 5,881,760 | A | * | 3/1999 | Del Zotto ............... B65D 88/76 137/264 |
| 5,948,253 | A | * | 9/1999 | Hearn .................... C02F 1/288 210/282 |
| 6,143,185 | A | * | 11/2000 | Tracy .................... B64D 11/02 210/195.1 |
| 6,331,195 | B1 | | 12/2001 | Faust et al. |
| 6,365,051 | B1 | | 4/2002 | Bader |
| 6,389,834 | B1 | * | 5/2002 | LeClear ................ F24F 1/0003 62/262 |
| 6,401,473 | B1 | * | 6/2002 | Ng ........................ B64D 13/06 454/71 |
| 6,427,458 | B1 | | 8/2002 | Fowler |
| 6,449,963 | B1 | * | 9/2002 | Ng ........................ B64D 13/06 454/71 |
| 6,902,678 | B2 | * | 6/2005 | Tipton ..................... B63J 4/002 210/669 |
| 7,005,175 | B2 | | 2/2006 | Hachenberg et al. |
| 7,470,300 | B2 | * | 12/2008 | Faust .................... B01D 45/16 55/394 |
| 8,074,933 | B2 | * | 12/2011 | Mackulin ............... B64C 1/1453 137/209 |
| 8,240,168 | B2 | * | 8/2012 | Holguin ............... B60H 1/3233 62/285 |
| 8,245,974 | B2 | * | 8/2012 | Paul ........................ B64C 1/403 244/119 |
| 8,272,597 | B2 | * | 9/2012 | Kennedy ................ B64D 11/02 244/118.5 |
| 8,544,219 | B1 | * | 10/2013 | Janesky ................ E04B 1/7023 4/682 |
| 9,783,308 | B2 | * | 10/2017 | Holmes .................... B64C 1/067 |
| 2002/0056286 | A1 | * | 5/2002 | Ng ........................ B64D 13/06 62/402 |
| 2003/0211291 | A1 | * | 11/2003 | Castiglione ........... B64D 13/00 428/172 |
| 2004/0218989 | A1 | * | 11/2004 | Huber .................... B64C 1/20 410/92 |
| 2006/0225200 | A1 | * | 10/2006 | Wierenga ............. B61D 35/007 4/664 |
| 2007/0164158 | A1 | * | 7/2007 | Buchholz ............... B64D 13/00 244/119 |
| 2008/0087767 | A1 | * | 4/2008 | Scott .................. B64D 11/0007 244/118.6 |
| 2008/0302910 | A1 | | 12/2008 | Calamvokis |
| 2009/0084253 | A1 | | 4/2009 | Bellino et al. |
| 2009/0178727 | A1 | * | 7/2009 | Murphy .................. F24F 13/22 141/35 |
| 2009/0189018 | A1 | | 7/2009 | Dittmar et al. |
| 2010/0044512 | A1 | | 2/2010 | Carsten |
| 2012/0096879 | A1 | * | 4/2012 | Lam ....................... B64D 37/32 62/93 |
| 2012/0186282 | A1 | * | 7/2012 | Army ..................... B64D 13/00 62/93 |
| 2013/0331019 | A1 | | 12/2013 | Piesker |
| 2014/0008144 | A1 | | 1/2014 | Savian et al. |
| 2015/0000749 | A1 | * | 1/2015 | Holmes .................. B64C 1/067 137/1 |
| 2015/0021006 | A1 | * | 1/2015 | Vue ........................ F24F 13/04 165/263 |
| 2015/0135661 | A1 | * | 5/2015 | MacDonald .......... F24F 13/082 55/440 |

FOREIGN PATENT DOCUMENTS

| | | | |
|---|---|---|---|
| CN | 101410297 A | | 4/2009 |
| CN | 103422885 A | | 12/2013 |
| EP | 2479108 A2 | | 7/2012 |
| FR | 2720340 A1 | | 12/1995 |
| GB | 530320 A | * 12/1940 | ............ B64D 13/08 |
| GB | 2167551 A | | 5/1986 |
| JP | H04186035 A | | 7/1992 |
| JP | 201141257 A | | 5/2001 |
| JP | 2006087672 A | | 4/2006 |
| WO | 2012063095 A1 | | 5/2012 |

OTHER PUBLICATIONS

EP Office Action for related application 141965806 dated Apr. 11, 2016; 5 pp.

EPO Extended European Search Report for related application 15151229.0 dated Jun. 2, 2015; 7 pp.

EP Extended European Search Report for related application No. 14196580.6 dated May 6, 2015;.

Canada Office Action for related application 2,862,480 dated Oct. 26, 2016; 3 pp.

China Office Action for related application 201410602409.0 dated Sep. 27, 2017; 4 pp.

Notices of Reasons for Rejection for Japanese Patent Application No. 2014-235388, dated Dec. 25, 2017, 8 pages.

China Office Action and Search Report for related application 201410602409.0 dated Apr. 16, 2018; 6 pp.

EP Examination Report for related application 15151229.0 dated Apr. 16, 2018; 4 pp.

Brazilian Written Opinion and Search Report regarding BR102014027188 dated Mar. 29, 2020 with English Translation.

* cited by examiner

METHOD, SYSTEM, AND DEVICE FOR LIQUID DRAINAGE

BACKGROUND

The present disclosure relates generally to ventilation systems and, more particularly, to methods and systems for liquid drainage in environmental control systems.

In some known aircraft environmental control systems (ECSs), ambient air is conditioned by air conditioning packs before being directed towards compartments of the aircraft such as the cabin. The conditioned air is generally distributed via an air distribution assembly including ducts, valves, and fans. The moisture content of the ambient air is at least partially dependent on the ambient conditions surrounding the aircraft. As conditioned air is circulated through the air distribution assembly, moisture can form due to a variety of environmental factors. For example, in hot and humid environments, moisture may flow past the air conditioning packs and through the air distribution system to form water droplets on interior surfaces of the distribution ducts. The water droplets may discharge or drip into the cabin and/or on passengers via ECS airflow outlets as the aircraft maneuvers during flight.

BRIEF SUMMARY

In one aspect, a drainage system for use with an air distribution system is provided. The drainage system includes a drain tube coupled to the air distribution system, a sump coupled to the drain tube and configured to receive liquid from the drain tube, and a suction system in flow communication with the sump. The suction system is configured to create a pressure in the sump that is lower than a pressure in the air distribution system.

In another aspect, a suction system configured for use with a drainage system of an air distribution system is provided. The suction system includes a sump coupled to the air distribution system and configured to receive liquid from the drainage system and a fan configured to create a pressure in the sump that is lower than a pressure in the air distribution system.

In yet another aspect, a method of assembling a drainage system is provided. The method includes coupling a drain tube to an air distribution system, coupling a sump to the drain tube, wherein the sump is configured to receive liquid from the drain tube, and coupling a suction system with the sump, wherein the suction system is in flow communication with the sump and is configured to create a pressure in the sump that is lower than a pressure in the air distribution system.

DETAILED DESCRIPTION

Figure 1:
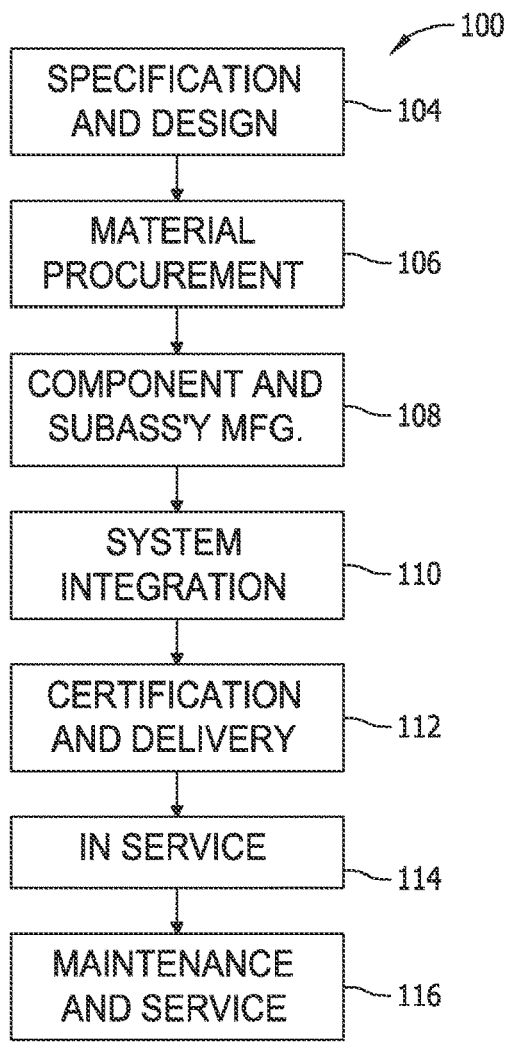
FIG. 1 is a flow diagram of an exemplary aircraft production and service methodology.
Figure 2:
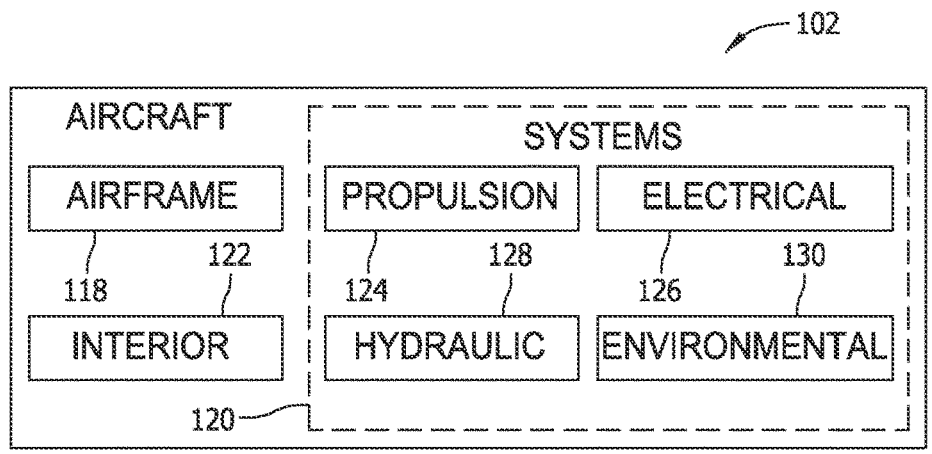
FIG. 2 is a block diagram of an exemplary aircraft that may be fabricated using the system shown in FIG. 1.

The methods and systems are described herein are in the context of a manufacturing and service method 100 (shown in FIG. 1) for an aircraft 102 (shown in FIG. 2). Alternatively, the methods and systems described herein may be implemented in any context and/or in any environment involving an air distribution system. During pre-production, method 100 may utilize specification and design 104 of aircraft 102 and/or material procurement 106. During production, component and subassembly manufacturing 108 and system integration 110 of aircraft 102 occurs. Thereafter, aircraft 102 may go through certification and delivery 112 prior to being placed in service 114. While in service by a customer, aircraft 102 is scheduled for routine maintenance and service 116 (including, for example, modification, reconfiguration, and/or refurbishment).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced using method 100 may include an airframe 118 having a plurality of systems 120 and an interior 122. Examples of systems 120 may include one or more of a propulsion system 124, an electrical system 126, a hydraulic system 128, and/or an environmental system 130. Any number of other systems may be included. Although an aircraft is provided as an exemplary implementation, the principles of the invention may be applied to other industries, such as the automotive industry, machinery, heavy equipment, and heating, ventilation, and air conditioning (HVAC) applications.

Apparatus and methods embodied herein may be employed during any one or more of the stages of the production and service method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of or reducing the cost of aircraft 102. Similarly, one or more of apparatus implementations, method implementations, or a combination thereof may be utilized while aircraft 102 is in service, for example and without limitation, to maintenance and service 116.

Figure 3:
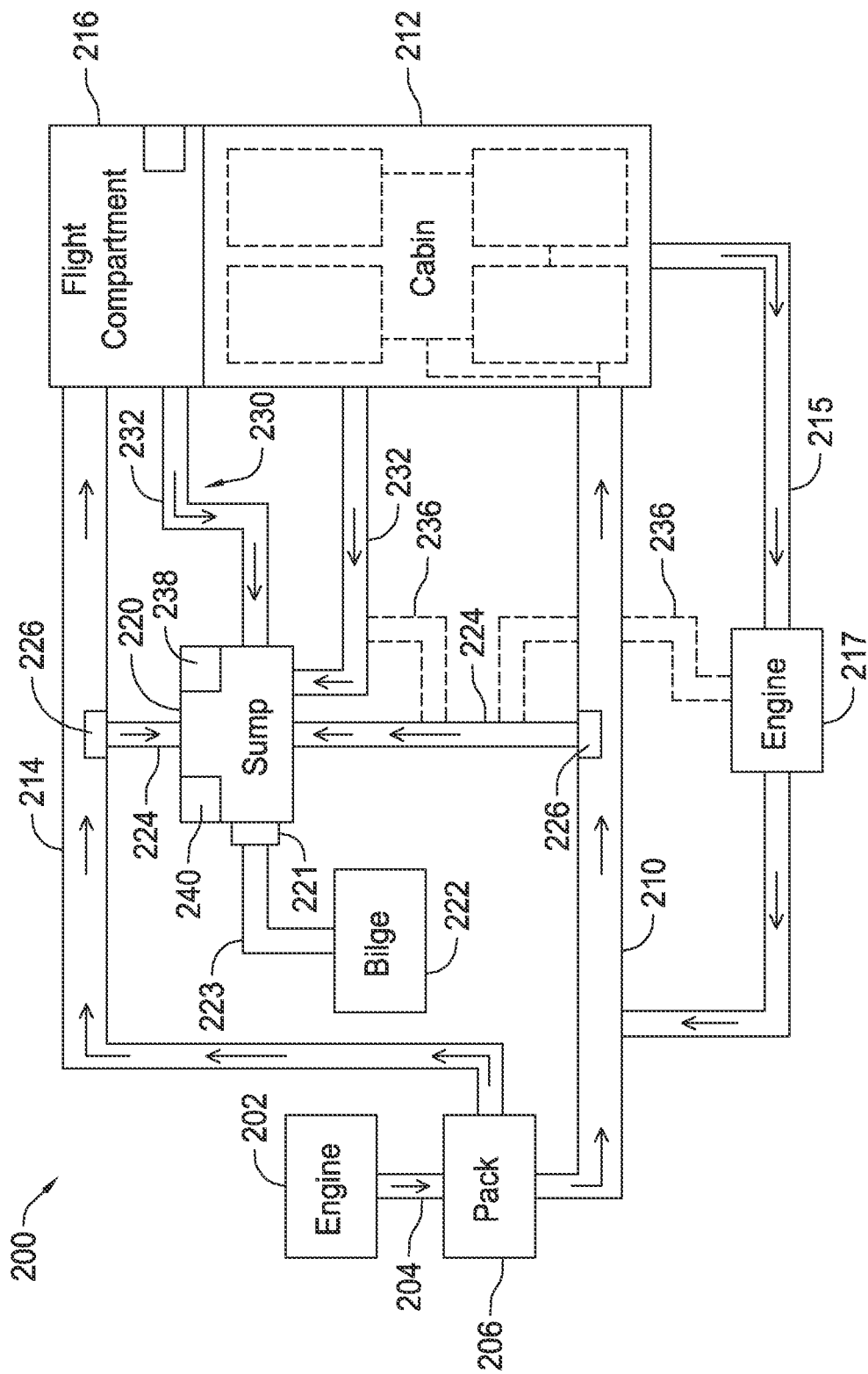
FIG. 3 is a schematic diagram of an exemplary aircraft environmental control system for use with the aircraft shown in FIG. 2.

FIG. 3 is a schematic diagram of an exemplary aircraft environmental control system (ECS) 200. In the exemplary implementation, ECS 200 is supplied with air received from a compressor (not shown) of an aircraft engine 202 through an inlet duct 204. Inlet duct 204 is coupled in flow communication to an air cycle machine or air conditioning unit (PACK) 206. PACK 206 is configured to condition and to cool air received from duct 204.

Downstream from PACK 206, ECS 200 includes ducting for channeling conditioned air into one or more zones of aircraft 102 (shown in FIG. 2). For example, in the exemplary implementation, ECS 200 includes a cabin air supply duct 210 for supplying conditioned air to a passenger cabin 212 of aircraft 102. Additionally or alternatively, ECS 200 includes a flight compartment supply duct 214 for supplying conditioned air to a flight compartment 216 of aircraft 102. ECS 200 further includes a cabin recirculated air duct 215 coupled in flow communication to cabin 212. At predetermined time periods, a fan 217 draws air out of cabin 212 for added ventilation to the conditioned air via recirculated air. Cabin recirculated air duct 215 is in flow communication with cabin air supply duct 210 to facilitate mixing the recirculated air from cabin 212 with conditioned air from PACK 206. In some implementations, pack 206, fan 217, and ducts 204, 210, 214, and 215 are referred to as an environmental control system. In some implementations, fan 217 and ducts 210, 214, and 215 are referred to as an air distribution system.

In the exemplary implementation, ECS 200 further includes a drain sump 220 and a bilge 222. Sump 220 is coupled to air ducts 210 and 214 via drain tubes 224 and is configured to retain liquid formed in ducts 210 and 214. In some implementations tubes 224 are fabricated from a substantially flexible and liquid impermeable material having a diameter in the range between about 0.5 inches and 0.75 inches. Alternatively, tubes 224 can be fabricated from any material and be any size that facilitates drainage as described herein. Sump 220 is coupled to bilge 222 via an outlet 221 and bilge line 223 that is configured to enable liquid retained in sump 220 to flow to bilge 222. Bilge 222 is configured to retain liquid and/or waste until releasing the contents of bilge 222 at a predetermined or user instructed time. Although ECS 200 is shown having a single sump 220, in some implementations, multiple sumps are used throughout ECS 200 to retain liquid and/or waste that will be moved to sump 220 and/or bilge 222. In some implementations, the liquid and/or waste is water. In the exemplary implementation, one or more sensors 240 are positioned within sump 220. Sensors 240 are configured to monitor at least one of a water level and a pressure within sump 220 and/or drain tubes 224.

In the exemplary implementation, scuppers 226 are coupled and/or positioned within ducts 210 and 214 for collecting and/or retaining moisture carried through ducts 210 and 214. Scuppers 226 are coupled to drain tubes 224 and in flow communication with sump 220.

In the exemplary implementation, a suction system 230 is coupled to sump 220. In one implementation, suction system 230 is a ventilation system such as, but not limited to, a lavatory and galley ventilation system for moving waste air from lavatories, wash basins, galleys, compartments, and/or chiller monuments. In such an implementation, suction system 230 includes pressure drain lines 232 that are configured to move waste air from cabin 212 and/or flight compartment 216. Suction system 230 maintains a relatively constant negative pressure within drain lines 232 enabling waste air to move through lines 232 regardless of orientation. In some implementations, the relatively constant negative pressure is achieved via a fan, vacuum pump, or blower (not shown). Alternatively, the relatively constant negative pressure can be formed in any manner that facilitates moving liquid as described herein. Drain lines 232 may couple directly to drain tubes 224 to provide negative pressure within drain tubes 224.

In another implementation, suction system 230 is an existing fan system (e.g., fan 217) within aircraft 102. In such an implementation, fan 217 is coupled to drain tubes 224 via a circulation line 236. Alternatively, suction system 230 may be a fan 238 positioned and/or coupled within sump 220. In some implementations, the negative pressure within suction system 230 is in the range between about 5 inches of water column (in. H$_2$O) and about 8 in. H$_2$O. Alternatively, the negative pressure within suction system 230 can be any pressure that facilitates movement of waste air as described herein. Suction system 230 enables drain tubes 224 to be oriented in any manner that enables flow communication between sump 220 and scupper 226, which may provide space efficiencies in the air distribution system. As such, suction system 230 substantially eliminates the necessity of orienting drain tubes 224 in a gravity feed orientation to enable liquid and/or moisture to flow to sump 220.

In the exemplary implementation, ECS 200 further includes an air management controller 250 located in flight compartment 216. While described herein as being located in flight compartment 216, air management controller 250 may be located in cabin 212, remotely located and controlled from a ground position, and/or any other location that enables controller 250 to function as described herein. Air management controller 250 is communicatively coupled to sensor 240 to receive measurements sensed by sensor 240. Air management controller 250 is also communicatively coupled to sump 220. Air management controller 250 is configured to calculate and maintain a target water level and/or pressure of sump 220 and/or drain lines 224 necessary to facilitate minimizing moisture levels in ducts 210 and 214. The desired water level and/or pressure of sump 220 and/or drain lines 224 may be programmed into air management controller 250 or may be input into controller 250 by a user. As a result, air management controller 250 adjusts the water level and/or pressure of sump 220 depending on the application to facilitate minimizing the moisture levels within the air distribution system.

In operation, air and/or moisture is carried through ducts 210 and 214 towards cabin 212 and/or flight compartment 216. Moisture and/or liquid traveling through ducts 210 and 214 is collected and/or retained by scuppers 226 positioned within ducts 210 and 214. Suction system 230 coupled to sump 220 creates a negative pressure on drain lines 224 forcing liquid collected and/or retained by scuppers 226 toward sump 220. In the exemplary implementation, the pressure in sump 220 and/or drain lines 224 is a negative pressure and the pressure in ducts 210 and 214 is a positive pressure. Alternatively, the pressure in sump 220 and/or drain lines 224 is less than the pressure in ducts 210 and 214.

Figure 4:
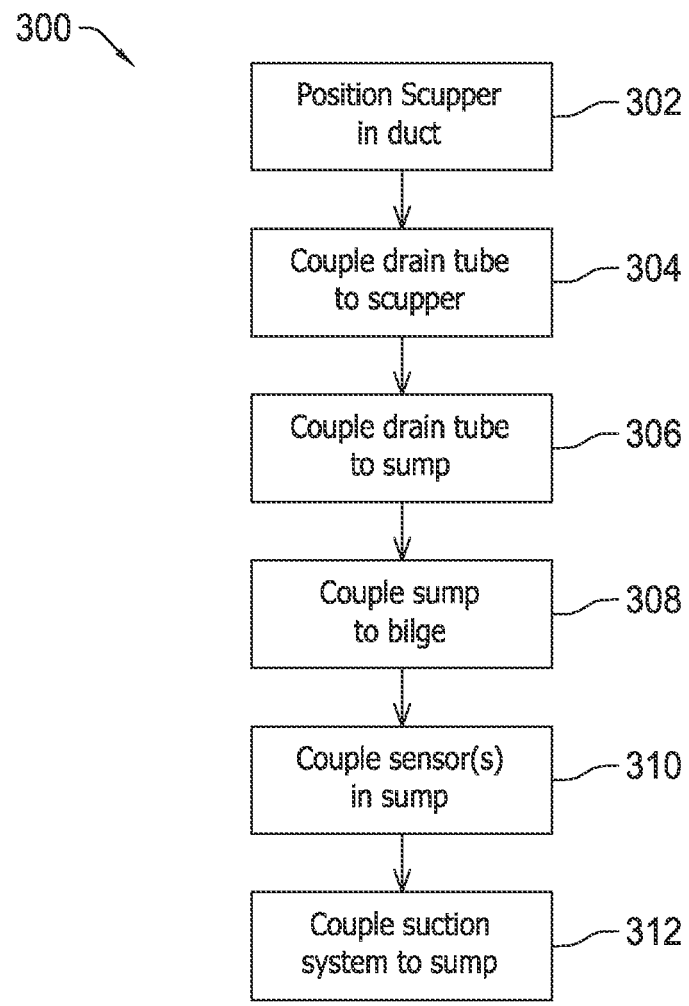
FIG. 4 is a flowchart of an exemplary method for assembling the drainage system shown in FIG. 3.

FIG. 4 is a flowchart of an exemplary method 300 for assembling a drainage system, such as ECS 200 (shown in FIG. 3). Method 300 includes positioning 302 scupper 226 in an air distribution system. In the exemplary implementation, scupper 226 is positioned within an air distribution duct, including but not limited to, ducts 210 and/or 214 of aircraft 102. Drain tube 224 is coupled 304 to scupper 226 and coupled 306 to sump 220 to provide flow communication between scupper 226 and sump 220. In the exemplary implementation, sump 220 is coupled 308 to bilge 222 and at least one sensor 240 is positioned 310 in or near sump 220 to monitor at least one of a water level and a pressure within sump 220 and/or drain tube 224.

In the exemplary implementation, a suction system is coupled 312 to sump 220. The suction system creates a pressure in sump 220 that is lower than a pressure in the air distribution system. In one implementation, the suction system is a ventilation system such as, but not limited to, a lavatory and galley ventilation system. In another implementation, the suction system is a fan used within aircraft 102 (e.g., fan 217) and is coupled to drain tube 224 and/or sump 220 via a circulation line 236. In yet another implementation, the suction system is fan, vacuum pump, and/or blower positioned within sump 220 and/or drain tube 224.

The implementations described herein facilitate draining liquid and/or moisture flowing in an air distribution system. The methods and systems described herein enable liquid and/or moisture to drain from air distribution ducts without requiring drain lines to be oriented in a substantially vertical orientation. The suction system provided herein eliminates the necessity of gravity fed drain tubes, which can provide cost and space efficiencies when assembling air distribution systems.

The implementations described herein relate generally to ventilation systems and, more particularly, to methods and systems for liquid drainage in environmental control systems and are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

An element or step recited in the singular and proceeded with the word "a" or "an" should be understood as not excluding plural elements or steps unless such exclusion is explicitly recited. Moreover, references to "one implementation" of the present invention and/or the "exemplary implementation" are not intended to be interpreted as excluding the existence of additional implementations that also incorporate the recited features.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drainage system for use with an air distribution system, said drainage system comprising:
   a drain tube coupled to an air duct of the air distribution system, said drain tube oriented to channel liquid from the air duct;
   a sump, said drain tube coupled to said sump, said sump oriented to receive the liquid discharged from said drain tube; a bilge coupled to said sump, said bilge oriented to receive the liquid from said sump; and
   a suction system in flow communication with said sump for drawing air from said sump to create a pressure in said sump that is lower than a pressure in the air distribution system to force the liquid channeled in said drain tube towards said sump, and into said bilge.

2. The drainage system according to claim 1, further comprising a scupper coupled in the air distribution system and in flow communication with said drain tube.

3. The drainage system according to claim 1, wherein said suction system comprises a fan configured to create a pressure in said sump.

4. The drainage system according to claim 3, wherein said fan is coupled in at least one of said sump and said drain tube.

5. A suction system configured for use with a drainage system of an air distribution system, said suction system comprising:
   a sump coupled to the air distribution system and oriented to receive liquid channeled from an air duct of the air distribution system and into said drainage system via a drain tube coupled to the air duct and said sump;
   a bilge coupled in flow communication with said sump, and configured to receive the liquid from said sump; and
   a suction device in flow communication with said sump for drawing air from said sump to create a pressure in said sump that is lower than a pressure in the air distribution system to force the liquid channeled in said drainage system towards said sump, and into said bilge.

6. The suction system according to claim 5, wherein the air distribution system is on an aircraft.

7. The suction system according to claim 5, further comprising a drain tube coupled to said sump and said air distribution system.

8. The suction system according to claim 7, wherein said suction device is a fan.

9. The suction system according to claim 8, wherein said fan is positioned in at least one of said sump and said drain tube.

10. The suction system according to claim 5, further comprising at least one secondary sump coupled to said sump.

11. A method of assembling a drainage system, said method comprising:
    coupling a drain tube to an air distribution system, the drain tube oriented to channel liquid from an air duct of the air distribution system;
    coupling a sump to the drain tube, wherein the sump is oriented to receive the liqud discharged from the drain tube;
    coupling a bilge to the sump, wherein the bilge is oriented to receive the liquid from the sump; and
    coupling a suction system with the sump, wherein the suction system is in flow communication with the sump for drawing air from the sump to create a pressure in the sump that is lower than a pressure in the air distribution system to force the liquid channeled in the drain tube towards the sump, and into the bilge.

12. The method according to claim 11, wherein coupling the drain tube to the air distribution system comprises coupling the drain tube to an air distribution system of an aircraft.

13. The method according to claim 11, wherein coupling the suction system further comprises coupling the suction system including a fan.

14. The method according to claim 11, further comprising positioning a sensor in the sump, wherein the sensor is configured to monitor at least one of a water level and a pressure.

15. The method according to claim 11, further comprising positioning a scupper in the air distribution system.

* * * * *

UNITED STATES PATENT AND TRADEMARK OFFICE
CERTIFICATE OF CORRECTION

PATENT NO. : 11,118,808 B2
APPLICATION NO. : 14/098970
DATED : September 14, 2021
INVENTOR(S) : Fue Chue Vue Page 1 of 1

It is certified that error appears in the above-identified patent and that said Letters Patent is hereby corrected as shown below:

In the Claims

In Claim 11, Column 6, Line 38, delete "liqud" and insert therefor -- liquid --.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*